(12) United States Patent
Heiligensetzer

(10) Patent No.: US 6,748,298 B2
(45) Date of Patent: Jun. 8, 2004

(54) METHOD FOR LIMITING THE FORCE ACTION OF A ROBOT PART

(75) Inventor: Peter Heiligensetzer, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 10/459,950

(22) Filed: Jun. 12, 2003

(65) Prior Publication Data

US 2003/0233171 A1 Dec. 18, 2003

(30) Foreign Application Priority Data

Jun. 15, 2002 (DE) .......................... 102 26 853

(51) Int. Cl.⁷ .................... G05B 15/00; G05B 19/00
(52) U.S. Cl. .................. 700/260; 700/245; 700/231; 700/257; 700/264; 700/255; 600/101; 600/424; 606/1; 606/167; 606/205; 606/207; 318/254; 318/560; 318/568.11; 318/568.16; 318/634; 901/6; 901/36
(58) Field of Search ................. 700/260, 245, 700/231, 255, 257, 264; 318/254, 560, 634, 3, 568.11, 568.16; 600/101, 104, 424; 606/1, 130, 205, 167, 207; 901/6, 36

(56) References Cited

U.S. PATENT DOCUMENTS

| | | | |
|---|---|---|---|
| 2002/0120188 A1 * | 8/2002 | Brock et al. ................. | 600/407 |
| 2003/0040758 A1 * | 2/2003 | Wang et al. ................. | 606/130 |
| 2003/0065358 A1 * | 4/2003 | Frecker et al. .............. | 606/205 |
| 2003/0097060 A1 * | 5/2003 | Yanof et al. ................ | 600/424 |
| 2003/0147725 A1 * | 8/2003 | Glass et al. ................. | 414/8 |
| 2003/0176948 A1 * | 9/2003 | Green .......................... | 700/264 |
| 2003/0195664 A1 * | 10/2003 | Nowlin et al. ............... | 700/260 |
| 2003/0210259 A1 * | 11/2003 | Liu et al. .................... | 345/702 |
| 2003/0216715 A1 * | 11/2003 | Moll et al. ................... | 606/1 |
| 2003/0220541 A1 * | 11/2003 | Salisbury et al. ............ | 600/101 |

FOREIGN PATENT DOCUMENTS

| | | |
|---|---|---|
| AU | 401 746 | 11/1996 |
| DE | 195 17 771 | 11/1996 |
| DE | 695 01 292 | 5/1998 |
| DE | 198 10 341 | 9/1999 |
| EP | 0 365 681 | 5/1990 |
| EP | 0 689 093 | 1/1996 |
| EP | 0 689 903 | 1/1996 |

OTHER PUBLICATIONS

Brandolini et al., Signal evaluation and measurement techniques in a single cell hybrid tactile sensor for large object manipulation, 1990, IEEE, pp. 126–131.*
V. V. Chapnik et al., Aug. 1991, Modeling Impact on a One-Link Flexible Robotic Arm, IEEE Transaction on Robotics and Automation, vol. 7, No. 4.

* cited by examiner

Primary Examiner—William A. Cuchlinski, Jr.
Assistant Examiner—McDieunel Marc
(74) Attorney, Agent, or Firm—McGlew and Tuttle, P.C.

(57) ABSTRACT

In order to reduce the risk of damage on external objects, material articles or persons during the operation of a robot, particularly a miniature robot, the invention provides a method for limiting the force action of a robot part, such as a robot arm, on such an external object during a collision in such a way that as a result of a maximum permitted force, maximum force $F_{max}$, acting on the object in the case of a collision, a corresponding, maximum permitted kinetic energy, maximum energy $E_{kin,max}$ of the robot part is determined, continuously and at adequately short time intervals the actual kinetic energy, actual energy $E_{kin}$, of the robot part is determined and on exceeding the maximum permitted energy $E_{kin,max}$, the actual operating speed V of the robot is reduced.

14 Claims, 2 Drawing Sheets

METHOD FOR LIMITING THE FORCE ACTION OF A ROBOT PART

FIELD OF THE INVENTION

The invention relates to a method for limiting the force action of a robot part, such as a robot arm, on an external object during a collision.

BACKGROUND OF THE INVENTION

If during working robots collide with external objects there can be considerable damage both to the object and to the robot. Thus, as a rule in the possible work area of a robot there should be no external objects, either in the form of material articles or persons. In order to protect the person or robot a protection is provided by fences or the like in defined work cells and these are secured in such a way that on entering the work cells, e.g. due to the opening of a door or the crossing of monitored lines, the robot is immediately stopped. It can optionally only be moved manually at a reduced speed. The stopping of the robot can give rise to considerable disadvantages, which may be of a business efficiency nature (downtime) or of an operational nature, such as damage to workpieces on which working was taking place at the time of the stoppage and which are consequently undesirable.

Miniature robots are known, in which kinetic energies and therefore in the case of a collision the forces which act are greatly reduced, but during a sequence of operations of a robot can be in areas leading to damage to material articles or persons, as well as to the robot. As a result of the aforementioned disadvantageous effects of an immediate stoppage of the robot when objects enter its work area, an attempt is made to avoid a stopping of the robot solely as a result of the fact that an object enters its work area. It is also necessary for a robot to approach objects, such as workpieces, in order to e.g. grip, machine or otherwise deal with the same. Here again collisions can occur, i.e. an approach with undesirably high speeds, kinetic energies and therefore undesired, high force actions.

In connection with such miniature robots it has been proposed that in the case of a collision a stoppage is brought about by the acting force with the exceeding of a predetermined inertia moment and therefore the drive motor current. It has already been proposed for reducing the force action to provide the robot or its parts with elastic or viscoelastic coverings or casings. In the first-mentioned case it has been considered disadvantageous that as a result the robot stoppage caused by the motor current is unacceptably delayed in the case of a collision and is to be prevented by a viscoelastic covering, i.e. the response times are to be shortened compared with a purely elastic covering (EP 689 903 A1). However, in all cases the force action is too high if the robot is to operate at optimum speeds for the particular operating process. However, the robot efficiency is reduced if from the outset the speeds are generally and fundamentally reduced for the entire sequence of operations in such a way that in the case of a collision, optionally taking account of the cushioning coverings, damage is reliably avoided.

The problem of the invention is therefore to provide a method for limiting the force action of a robot part in the case of a collision and which allows an optimization of the sequence of operations of the robot, whilst avoiding the aforementioned disadvantages and taking account of safety requirements.

SUMMARY OF THE INVENTION

According to the invention the set problem is solved with a method of the aforementioned type, wherein as a result of the maximum allowed force acting on the object in the case of a collision, maximum force $F_{max}$, a corresponding maximum permitted kinetic energy, maximum energy $E_{kin,max}$ of the robot part is determined wherein continuously at adequately short time intervals the actual kinetic energy, actual energy $E_{kin}$, of the robot part is determined and wherein on exceeding the maximum permitting energy $E_{kin,max}$, the actual operating speed v of the robot is reduced.

The kinetic energy can be reduced as a function of the situation or by a preset value. It can be an absolute or a relative value and in the latter case relative to the instantaneous operating speed, or an optimum operating speed resulting from the operating process. The reduction is generally in a range between 3 and 10% and is preferably 5%.

According to a preferred development, with which the efficiency of the robot subject to the method of the invention is increased or optimized, on exceeding the actual kinetic energy $E_{kin}$ compared with the maximum permitted kinetic energy $E_{kin,max}$ a check is made to establish whether the actual instantaneous operating speed is below the speed appropriate for the operating process performed by the robot and then the actual operating speed is increased in absolute or relative terms by a predetermined value.

In order to increase the maximum kinetic energy and therefore the efficiency for a given maximum force action, according to a further development of the invention in the case of the predetermined maximum permitted force $F_{max}$, the permitted maximum kinetic energy $E_{kin,max}$ is increased by a cushioning covering on robot parts and an elastic or viscoelastic covering or casing can be provided.

BRIEF DESCRIPTION OF THE DRAWINGS

Further advantages and features of the invention can be gathered from the claims and the following description of an embodiment of the invention with reference to the attached drawings, wherein show:

DETAILED DESCRIPTION OF THE DRAWINGS

Figure 1:
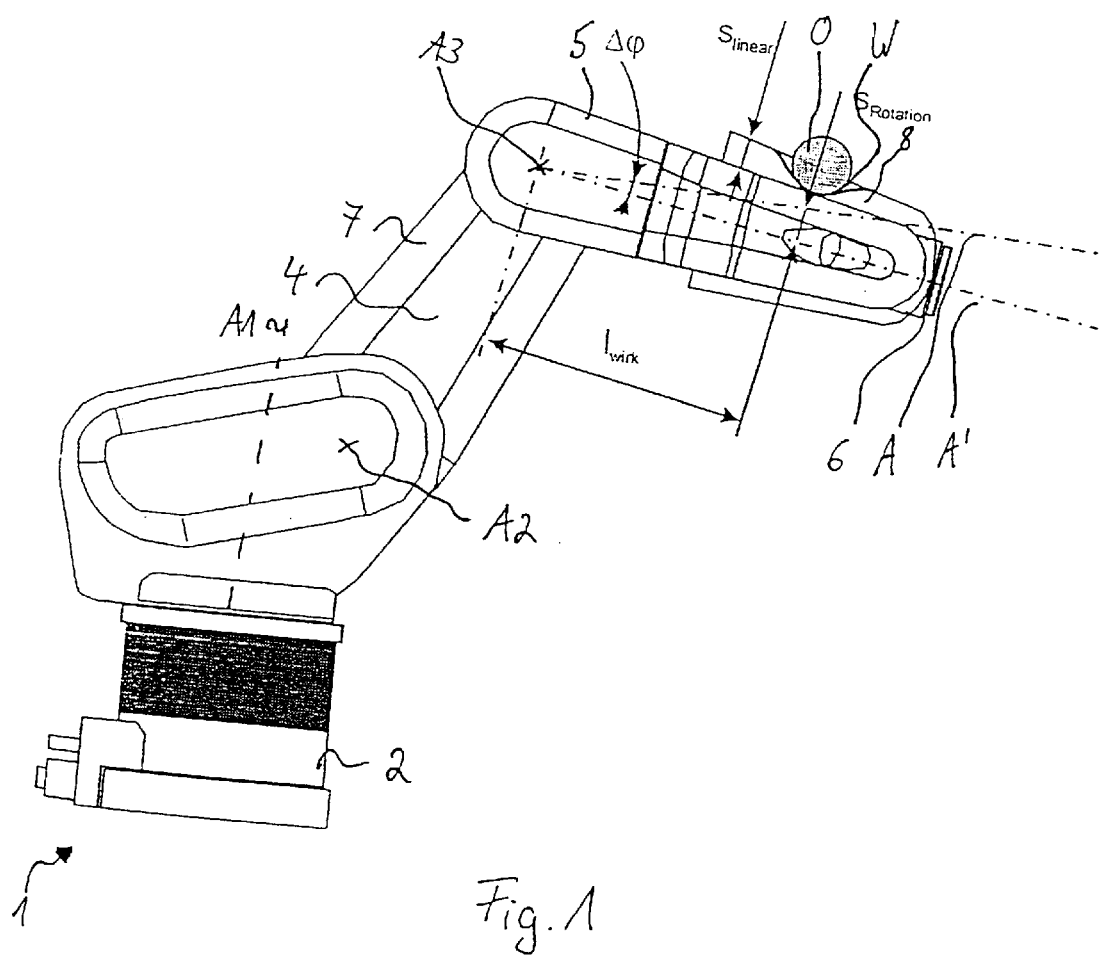
FIG. 1 A diagrammatic side view of a robot in which the invention is used.

A robot 1, particularly a miniature robot, has a base 2, on which a carrousel 3 is rotatable about a first, vertical robot axis A1. The carrousel 3 carries a robot rocker 4, which on the carrousel 3 is pivotable about a second, horizontal robot axis A2. The rocker 4 carries a robot arm 5, which is in turn pivotably articulated to the rocker about a third, horizontal robot axis A3. At the end remote from the rocker 4, the robot arm 5 has a hand flange 6 for fixing a not shown robot hand. Such a robot hand also has parts pivotable about three axes, the first of which is pivotable about the centre axis of the robot arm 5.

The robot according to the invention is provided or enveloped with cushioning coverings 7, 8, which can be elastic or viscoelastic coverings.

If the robot, e.g. with its arm 5 with the spacing of an active length $l_{act}$ strikes against an object O, the entire braking distance until the object strikes against the hard casing of the arm 5 is formed by two components, namely the linear path $S_{linear}$, which corresponds to the strength or thickness of the covering 8 and a rotary braking distance part $S_{Rotation}$, which corresponds to the displacement of the robot arm axis A' on colliding with the object O with respect to the orientation of the robot arm axis A in the case when the object was not present at the indicated location, i.e. no collision occurs:

$$S_{braking\ distance} \cong S_{linear} + S_{Rotation} = S_{linear} + \sin \Delta\psi \ast l_{act} \quad (1),$$

in which $l_{act}$ is the active length of the arm and $\Delta\psi$ the angular deviation of the arm on impact compared with the unhindered movement. The rotary part results from elasticities in the driving moment transmission, e.g. in the case of force transmission by chains with a spring chain tightener.

The force acting between the robot arm at action point W and the object O is determined in accordance with $$F = \frac{E_{kin}}{S_{braking\ distance}} = \frac{E_{kin}}{S_{linear} + S_{Rotation}} \quad (2)$$

in which F indicates the acting force and E the kinetic energy of the robot arm. If a force acting on an external object is not to exceed a predetermined, maximum permitted force or maximum force $F_{max}$, this corresponds to an optimum permitted kinetic energy $E_{kin,max}$.

According to the invention, the movement sequence resulting from the operating process of the robot with the speeds of the individual robot elements determined by the same and the given, actual kinetic energy $E_{kin}$ is continuously checked, i.e. cyclically at predetermined, short time intervals to establish whether the maximum permitted kinetic energy, maximum energy $E_{kin,max}$ is exceeded.

The total kinetic energy of the robot $E_{kin,robot}$ is composed optionally of the individual kinetic energies of the individual robot elements, as a function of the position of the action location W:

$$E_{kin,robot} = \sum_{(m)}^{n} E_{kin,j} \quad (3)$$

the individual kinetic energies of the summation $E_{kin,j}$ designating the kinetic energies of the carrousel, the rocker, the arm and optionally the hand and a load.

Figure 2:
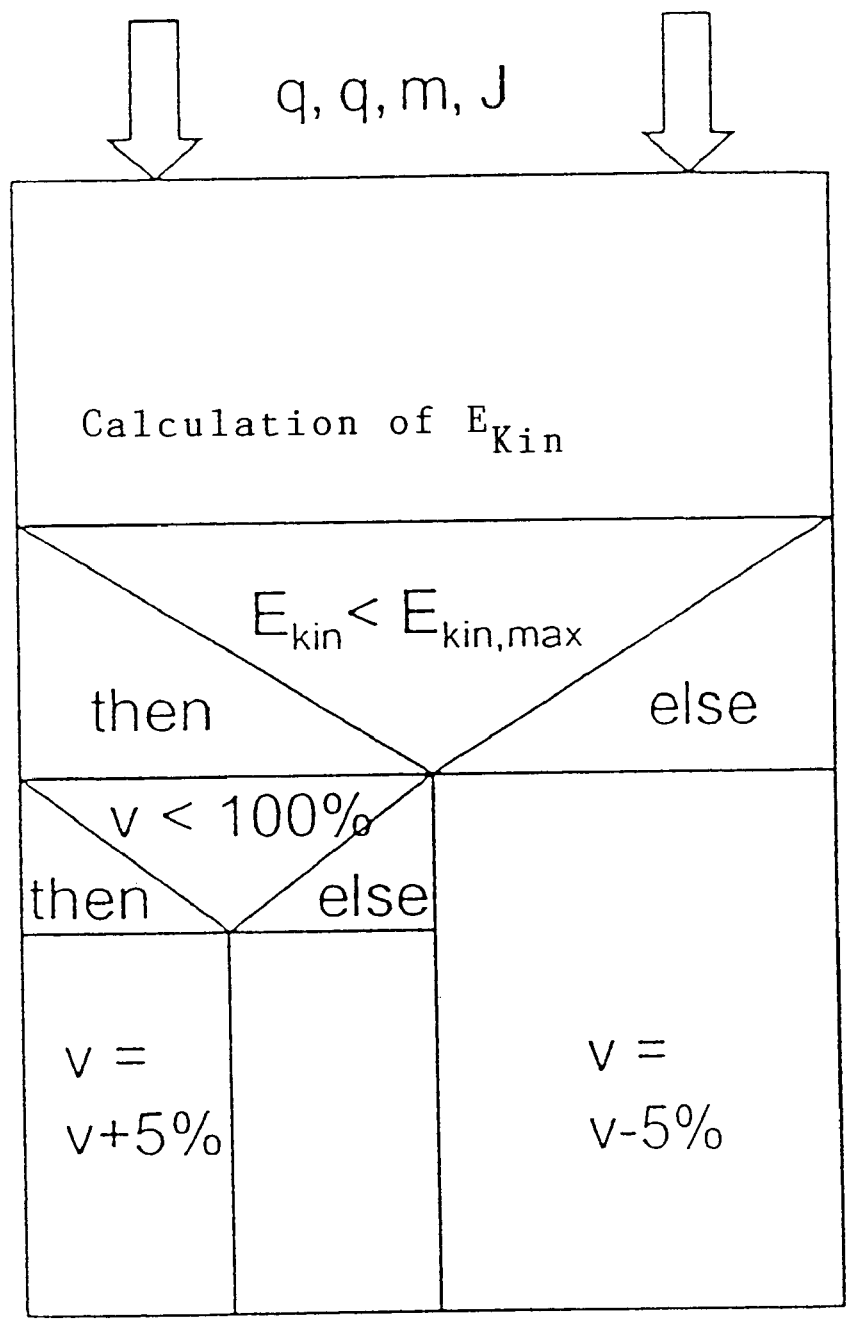
FIG. 2 A flow chart of a preferred development of the method according to the invention.

As shown in the flow chart of FIG. 2, in the method according to the invention as a result of the angle q, angular velocity q̇ of the particular joint, the mass of a partial body and an inertial tensor J in accordance with $$\begin{bmatrix} \dot{x} \\ \omega \end{bmatrix} = \begin{bmatrix} \overline{\overline{Q}}_1(\overline{q}) \\ \overline{\overline{Q}_2(\overline{q})} \end{bmatrix} \ast \dot{\overline{q}} = Q(\overline{q}) \ast \dot{\overline{q}} \quad (4)$$

determination takes place of the translatory barycentric velocity of a partial body x̄ and its angular velocity ω whilst making use of a calculation matrix $\overline{\overline{Q}}_1$ for the translatory barycentric velocity of the partial body x̄ as a function of the angle of the joint q̄ and a calculation matrix of $\overline{\overline{Q}}_2$ for the angular velocity ω as a function of the angular velocity of the joint Q̇ and from this in turn the kinetic energy $E_{kin}$ acting at the action location W in accordance with $$E_{kin} = \frac{1}{2\overline{0}} x^{-T} \ast m \ast 0\ \overline{\dot{x}} \frac{1}{2} \omega^T \ast \overline{\overline{J}} \ast \overline{\overline{\omega}} \quad (5)$$

in which J is the inertial tensor of a partial body.

As a result of this determination of the actual kinetic energy $E_{kin,actual}$, there is then a comparison thereof with the maximum permitted kinetic energy Ekin,max resulting from the maximum force. If the former exceeds the latter, the method sequence branches off in the right-hand part of the diagram of FIG. 2. There is then a reduction of the actual speed, actual speed v representing the aforementioned speeds, by a predetermined value, e.g. in the embodiment described by 5%, based on the maximum operating speed provided by the operating process. The calculation then takes place again in the next time interval, so that if there is still a force and energy excess, there is once again a speed reduction and therefore the kinetic energy and, for the case of a collision, the acting force undergoes a reduction. The determination of the kinetic energy and the comparison with the maximum permitted energy can take place in any interpolation cycle (IPO cycle), i.e. in any control-internal cycle of the robot control system and therefore all IO-Ims.

If the determination of the actual kinetic energy shows that it is below the maximum permitted kinetic energy $E_{kin,max}$, there is a further adjustment as to whether the actual operating speed v is below the speed desired for the operating process and assumed as 100% in the embodiment shown. If this is the case, the actual speed is increased by the predetermined value and in the embodiment shown by 5% based on the desired operating speed ($v_{des}$) predetermined by the operating process. If this is not the case, operation continues unchanged with the given values.

The case where the actual speed v is below the desired operating speed $v_{des}$ for the operating process can e.g. arise if after exceeding the kinetic energy in the preceding time intervals, therefore lowering thereof and of the operating speed, due to changed circumstances, e.g. because other axes with lower speeds are moved or the collision situation is different, in the following time intervals the actual kinetic energy $E_{kin}$ is below the maximum permitted energy $E_{kin,max}$.

What is claimed is:

1. Method for limiting the force action of a robot part, such as a robot arm, on an external object during a collision, wherein:

as a result of a maximum permitted force, maximum force $F_{max}$, acting on the object in the case of a collision, a corresponding maximum permitted kinetic energy, maximum energy $E_{kin,max}$, of the robot part is determined, continuously and at adequately short time intervals, the actual kinetic energy, actual energy $E_{kin}$, of the robot part is determined and on exceeding the maximum permitting energy $E_{kin,max}$, the actual operating speed v of the robot is reduced.

2. Method according to claim 1, wherein the operating speed v is reduced by a predetermined value.

3. Method according to claim 1, wherein the operating speed is reduced by a predetermined, absolute value.

4. Method according to claim 1, wherein the predetermined operating speed is reduced by a predetermined, relative value.

5. Method according to claim 4, wherein the operating speed is reduced by a relative value, which is related to the actual speed.

6. Method according to claim 4, wherein the operating speed is reduced by a relative value, based on the maximum speed given by the maximum energy $E_{kin,max}$.

7. Method according to claim 4, wherein the actual speed is reduced by a value between 3 and 10%.

8. Method according to claim 4, wherein the actual speed is reduced by a value of 5%.

9. Method according to claim 4, wherein on dropping below the actual kinetic energy $E_{kin}$ compared with the maximum permitted kinetic energy $E_{kin,max}$, a check is made as to whether the actual, instantaneous operating speed drops below the speed value in accordance with the operating process performed by the robot.

10. Method according to claim 9, wherein if the actual operating speed drops below the speed in accordance with the operating process performed by the robot, the actual operating speed is increased by a predetermined value, absolute or relative.

11. Method according to claim 9, wherein in the case of a predetermined, maximum permitted force $F_{max}$, the permitted maximum kinetic energy $E_{kin,max}$ is increased by a cushioning covering on robot parts.

12. Method according to claim 11, wherein the maximum permitted kinetic energy is increased by elastic coverings.

13. Method according to claim 11, wherein the maximum permitted kinetic energy is increased by viscoelastic coverings.

14. Method according to claim 11, wherein the permitted maximum kinetic energy is increased by elasticities in the drive line.

* * * * *